United States Patent

Hyuga et al.

[11] Patent Number: 6,047,014
[45] Date of Patent: Apr. 4, 2000

[54] SOLID STATE LASER AND METHOD OF MANUFACTURING THE SAME

[75] Inventors: Hiroaki Hyuga; Yoji Okazaki, both of Kanagawa-ken, Japan

[73] Assignee: Fuji Photo Film Co., Ltd., Kanagawa-ken, Japan

[21] Appl. No.: 09/160,352

[22] Filed: Sep. 25, 1998

[30] Foreign Application Priority Data

Sep. 26, 1997 [JP] Japan .................................... 9-261957

[51] Int. Cl.[7] ...................................................... H01S 3/08
[52] U.S. Cl. ........................... 372/108; 372/105; 372/98; 372/34; 372/27
[58] Field of Search ................................ 372/27, 22, 98, 372/105, 106, 19, 37, 108, 34

[56] References Cited

U.S. PATENT DOCUMENTS

| | | | |
|---|---|---|---|
| 3,596,201 | 7/1971 | Chester | 372/37 |
| 4,935,932 | 6/1990 | Johnson et al. | 372/105 |
| 5,048,030 | 9/1991 | Hiiro | 372/106 |
| 5,197,073 | 3/1993 | Oka | 372/106 |
| 5,206,867 | 4/1993 | Esterowitz et al. | 372/105 |
| 5,278,851 | 1/1994 | Goto | 372/19 |
| 5,640,406 | 6/1997 | Injeyan et al. | 372/106 |
| 5,671,240 | 9/1997 | Okazaki | 372/98 |

*Primary Examiner*—Leon Scott, Jr.
*Attorney, Agent, or Firm*—Sughrue, Mion, Zinn, Macpeak & Seas, PLLC

[57] ABSTRACT

A solid state laser includes a resonator, a solid laser crystal disposed in the resonator, a pumping source for pumping the laser crystal, a pair of $\lambda/4$ plates which is disposed in the resonator with the laser crystal intervening therebetween and makes an oscillation beam of a twisted mode, and a polarization control element which is disposed in the resonator and sets the linear polarization of the solid state laser beam in a predetermined direction. The solid laser crystal is a birefringent crystal and an optical axis of the birefringence of the solid laser crystal is oriented in the direction of the linear polarization of the solid state laser beam set by the polarization control element.

13 Claims, 6 Drawing Sheets

SOLID STATE LASER AND METHOD OF MANUFACTURING THE SAME

BACKGROUND OF THE INVENTION

1. Field of the Invention

This invention relates to a solid state laser, and more particularly to a solid state laser in which a pair of $\lambda/4$ plates are disposed in a resonator to make an oscillation beam of a twisted mode. This invention further relates a method of manufacturing such a solid state laser.

2. Description of the Related Art

There has been known, as disclosed for instance in Japanese Unexamined Patent Publication No. 62(1987)-189783, a solid state laser in which a solid laser rod doped with rare earth metal such as neodymium is pumped by a semiconductor laser (laser diode).

In such a solid state laser, it has been proposed to dispose a pair of $\lambda/4$ plates in the resonator to make an oscillation beam of a twisted mode (elliptically polarized mode) between the $\lambda/4$ plates, thereby making the oscillation mode of a single longitudinal mode.

Further as disclosed in U.S. Pat. No. 5,671,240, a polarization control element such as a Brewster plate is often provided in a resonator in a solid state laser of the type in which an oscillation beam is made of a twisted mode, thereby setting the linear polarization of the solid state laser beam in a predetermined orientation.

There has been a problem in conventional solid state lasers of the type in which an oscillation beam is made of a twisted mode that the resonator loss is large and accordingly it is difficult for the solid state laser to operate at a high power.

SUMMARY OF THE INVENTION

In view of the foregoing observations and description, the primary object of the present invention is to provide a solid state laser in which an oscillation beam is made of a twisted mode (will be referred to as "the twisted mode solid state laser", hereinbelow) and in which the resonator loss can be suppressed to permit the laser to operate at a high power.

Another object of the present invention is to provide a method of manufacturing such a solid state laser.

In accordance with a first aspect of the present invention, there is provided a solid state laser comprising a resonator, a solid laser crystal disposed in the resonator, a pumping source for pumping the laser crystal, a pair of $\lambda/4$ plates which is disposed in the resonator with the laser crystal intervening therebetween and makes an oscillation beam of a twisted mode, and a polarization control element which is disposed in the resonator and sets the linear polarization of the solid state laser beam in a predetermined direction, wherein the improvement comprises that the solid laser crystal is a birefringent crystal and an optical axis of the birefringence of the solid laser crystal is oriented in the direction of the linear polarization of the solid state laser beam set by the polarization control element.

In accordance with a second aspect of the present invention, there is provided a solid state laser comprising a resonator, a solid laser crystal disposed in the resonator, a pumping source for pumping the laser crystal, a pair of $\lambda/4$ plates which is disposed in the resonator with the laser crystal intervening therebetween and makes an oscillation beam of a twisted mode, and a polarization control element which is disposed in the resonator and sets the linear polarization of the solid state laser beam in a predetermined direction, wherein the improvement comprises that the solid laser crystal is an isotropic crystal exhibiting heat-induced birefringence, and an optical axis of the heat-induced birefringence of the solid laser crystal is oriented in the direction of the linear polarization of the solid state laser beam set by the polarization control element.

In accordance with a third aspect of the present invention, there is provided a solid state laser comprising a resonator, a solid laser crystal disposed in the resonator, a pumping source for pumping the laser crystal, a pair of $\lambda/4$ plates which is disposed in the resonator with the laser crystal intervening therebetween and makes an oscillation beam of a twisted mode, and a polarization control element which is disposed in the resonator and sets the linear polarization of the solid state laser beam in a predetermined direction, wherein the improvement comprises that the solid laser crystal is an isotropic crystal exhibiting heat-induced birefringence, and a heat radiator block of metal is fixed to the solid laser crystal.

In accordance with a fourth aspect of the present invention, there is provided a solid state laser comprising a resonator, a solid laser crystal disposed in the resonator, a pumping source for pumping the laser crystal, a pair of $\lambda/4$ plates which is disposed in the resonator with the laser crystal intervening therebetween and makes an oscillation beam of a twisted mode, and a polarization control element which is disposed in the resonator and sets the linear polarization of the solid state laser beam in a predetermined direction, wherein the improvement comprises that the difference in quantum of the phase between the two $\lambda/4$ plates is not larger than 3° and preferably not larger than 1°.

The method of manufacturing the solid state laser in accordance with the present invention is characterized in that the difference in quantum of the phase between the two $\lambda/4$ plates is set to be not larger than 3° and preferably not larger than 1°.

Specifically, in a method of the present invention, the difference in quantum of the phase between the two $\lambda/4$ plates is controlled by inclining at least one of the $\lambda/4$ plates relative to the optical axis of the laser oscillation.

In another method of the present invention, as the pair of $\lambda/4$ plates, those cut in the same orientation and ground under the same condition are used.

The $\lambda/4$ plates cut in the same orientation and ground under the same condition can be made, for instance, by grinding a large $\lambda/4$ plate material and dividing it into a pair of $\lambda/4$ plates or by simultaneously grinding a pair of $\lambda/4$ plate materials cut in the same orientation and cutting the materials into $\lambda/4$ plates.

We have found that a cause of the fact that resonator loss is apt to be generated in the conventional twisted mode solid state laser is that, in the case where a birefringent crystal or an isotropic crystal exhibiting heat-induced birefringence is employed as the solid laser crystal, the optical length of the crystal which the solid state laser beam, which travels back and forth in the resonator, experiences when it travels in one direction differs from that the solid state laser experiences when it travels in the other direction. That is, the difference in the optical lengths causes a phase difference between the solid state laser beams travelling in one direction and travelling in the other direction, which causes the resonator loss.

When an optical axis of the birefringence of the solid laser crystal is oriented in the direction of the linear polarization of the solid state laser beam set by the polarization control element, the direction polarization of the laser beam is rotated by 90° when reflected at an end face of the resonator, whereby the optical length which the polarization component in the direction of one optical axis of the solid laser crystal (in the direction in which the laser beam experiences refractive index no) experiences and that which the polarization component in the direction of another optical axis of the solid laser crystal (in the direction in which the laser beam experiences refractive index ne) experiences become of the same value Lopt represented by the following formula.

$$L_{opt} = n_o \cdot t + n_e \cdot t + \alpha$$

Thus the influence of birefringence can be cancelled.

Further we have found that anisotropy thermally induced in an isotropic crystal has an optical axis directed in a particular direction. When an optical axis of the heat-induced birefringence of the solid laser crystal is oriented in the direction of the linear polarization of the solid state laser beam set by the polarization control element, the optical length which the polarization component in the direction of one optical axis of the solid laser crystal experiences and that which the polarization component in the direction of another optical axis of the solid laser crystal experiences become of the same value Lopt for the similar reason. That is, $$L_{opt} = n_{o1} \cdot t + n_{o2} \cdot t + \alpha$$

wherein no1 and no2 respectively represents refractive indexes thermally induced in the solid laser crystal. Thus also in this case, the influence of birefringence can be cancelled.

Further when a heat radiator block of metal is fixed to the solid laser crystal which is an isotropic crystal exhibiting heat-induced birefringence, heat can be well radiated from the solid laser crystal and generation of heat-induced birefringence can be prevented or minimized, whereby resonator loss can be suppressed.

Further we have found that another cause of the fact that resonator loss is apt to be generated in the conventional twisted mode solid state laser is that there exists a difference in quantum of the phase between the two λ/4 plates. That is, the quantum of the phase of a λ/4 plate is often shifted from 90°, a designed value, by ±5% due to manufacturing error, which causes a difference in quantum of the phase between the two λ/4 plates.

We have found that even if the quantum of phase of each λ/4 plate is shifted from 90°, the resonator loss can be suppressed and the solid state laser can operate at a high power so long as the difference in the quantum of the phase between the two λ/4 plates is not larger than 3° (preferably not larger than 1°).

The difference in quantum of the phase between the two λ/4 plates can be controlled by inclining at least one of the λ/4 plates relative to the optical axis of the laser oscillation or by using λ/4 plates cut in the same orientation and ground under the same condition.

DESCRIPTION OF THE PREFERRED EMBODIMENTS

Figure 1:
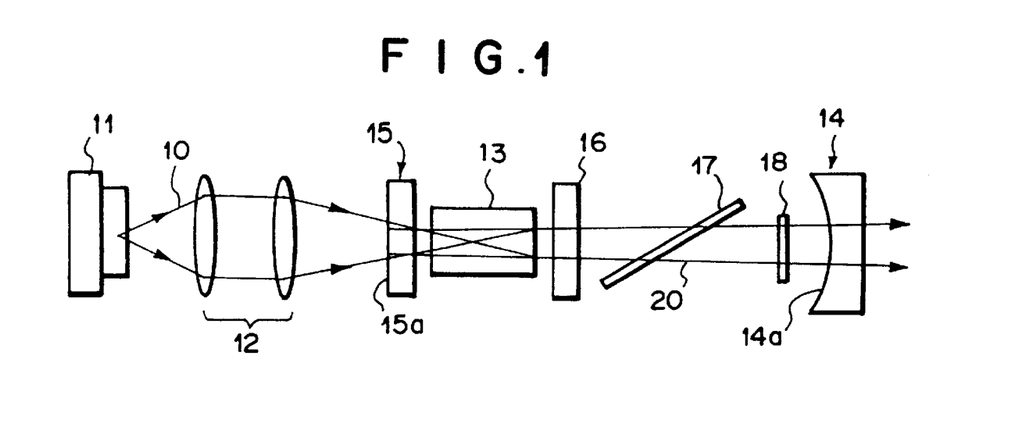
FIG. 1 is a schematic side view of a solid state laser in accordance with a first embodiment of the present invention.

In FIG. 1, a laser diode-pumped solid state laser in accordance with a first embodiment of the present invention comprises a semiconductor laser 11 which emits a laser beam 10 as a pumping light beam, a condenser lens 12 which converges the laser beam 10, which is a divergent light beam, a YLF crystal 13 which is a solid laser crystal doped with neodymium (Nd) (will be referred to as "Nd:YLF crystal", hereinbelow), a resonator mirror 14 which is disposed in front (the right side as seen in FIG. 1) of the Nd:YLF crystal 13, a pair of λ/4 plates 15 and 16 which are respectively disposed in front and rear of the Nd:YLF crystal 13, a Brewster plate 17 disposed between the λ/4 plate 16 and the resonator mirror 14, and an etalon 18 disposed between the Brewster plate 17 and the resonator mirror 14.

These components are integrally mounted in a housing (not shown). As will be described later, the λ/4 plate 15 and the resonator mirror 14 forms a resonator and the resonator 11 is kept at a predetermined temperature by a Peltier element and a temperature control circuit which are not shown.

Figure 2:
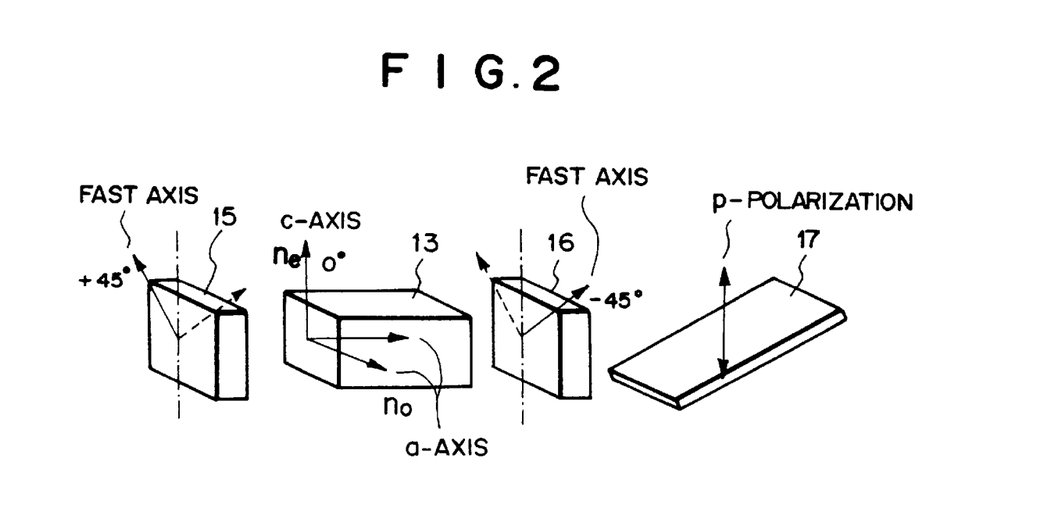
FIG. 2 is a schematic fragmentary perspective view showing an important part of the solid state laser of the first embodiment.

Now referring also to FIG. 2, the semiconductor laser 11 emits a laser beam 10 having a wavelength of 797 nm at an output power of 2 W. The Nd:YLF crystal 13 is doped with 2 at % of Nd, is a-cut and is 3 mm in crystal length. Neodymium ions in the Nd:YLF crystal 13 are pumped by the laser beam 10 and the Nd:YLF crystal 13 thereby produces a laser beam having a wavelength of 1325 nm.

The end face 15a of the λ/4 plate 15 facing the semiconductor laser 11 is provided with a coating which is highly reflective to light at 1325 nm and the mirror surface 14a of the resonator mirror 14 is provided with a coating which transmits only a part of light at 1325 nm. Thus light at 1325 nm oscillates between the surfaces 15a and 14a and a laser beam 20 at 1325 nm is generated. The laser beam 20 is emitted through the resonator mirror 14.

The λ/4 plates 15 and 16 are positioned with their phase advance axes at 90° to each other. With this arrangement of the λ/4 plates 15 and 16, the laser beam 20 is converted to a twisted mode between the λ/4 plate 15 and 16. As a result, the laser beam 20 naturally oscillates at the gain peak wavelength. In this state, another resonator mode is generated at a distance of several to several tens of longitudinal modes from the primary longitudinal mode when the output power of the solid state laser is increased as described above. However in this embodiment, the etalon 18 suppresses generation of such another resonator mode.

On the contrary, if oscillating wavelength selection is effected only by the etalon 18, adjacent resonator modes are generated when the output power of the solid state laser is increased. However in this embodiment, formation of the twisted mode suppresses generation of the adjacent resonator modes.

As can be understood from the description above, in the solid state laser of the present invention, the oscillation mode is made of a single longitudinal mode by the twisted mode forming effect of the λ/4 plates 15 and 16 and the wavelength selection effect of the etalon 18.

The Brewster plate 17 is positioned at a Brewster angle to the optical axis of the resonator and only the p-polarized component passes through the Brewster plate 17, which sets the direction of linear polarization of the laser beam 20 to the vertical direction as seen in FIGS. 1 and 2.

As shown in FIG. 2, the Nd:YLF crystal 13, which is a positive uniaxial crystal, is a-cut and is positioned so that the plane including the a-axis and the c-axis is perpendicular to the optical axis of the resonator. With this arrangement, the polarization component in the direction of the a-axis of the laser beam 20 experiences an ordinary index no and the polarization component in the direction of the c-axis of the laser beam 20 experiences an extraordinary index ne. That is, the laser beam 20 experiences two refractive indexes, i.e., birefringence.

The Nd:YLF crystal 13 is positioned with one optical axis of birefringence, i.e., the c-axis, oriented in the direction of the linear polarization of the solid state laser beam 20 set by the Brewster plate 17. With this arrangement, the influence of birefringence is cancelled and the resonator loss can be suppressed, whereby the solid state laser can operate at a high output power as described above.

In this embodiment, the output power of the laser beam was 600 mW. In a conventional solid state laser which is substantially the same in the structure as that shown in FIG. 1 except that neither the c-axis nor the a-axis is oriented in the direction of the linear polarization of the solid state laser beam 20 set by the Brewster plate 17, the output power of the laser beam is generally 100 to 200 mW. This fact proves the effect of the present invention.

Though, in this embodiment, the c-axis of the Nd:YLF crystal 13 is oriented in the direction of the linear polarization of the solid state laser beam 20 set by the Brewster plate 17, the same result can be obtained even if the other optical axis of birefringence of the crystal 13, that is, the a-axis is oriented so.

As the uniaxial solid laser crystal, various crystals other than a Nd:YLF crystal 13 may also be employed. For example, a crystal of $Nd:YVO_4$, $Nd:GdVO_4$, Yb:YLF, Cr:LiSAF, Cr:LiCAF, $LNA(La_{1-x}Nd_xMgA_{11}O_{19}$ or the like may be employed.

Figure 3:
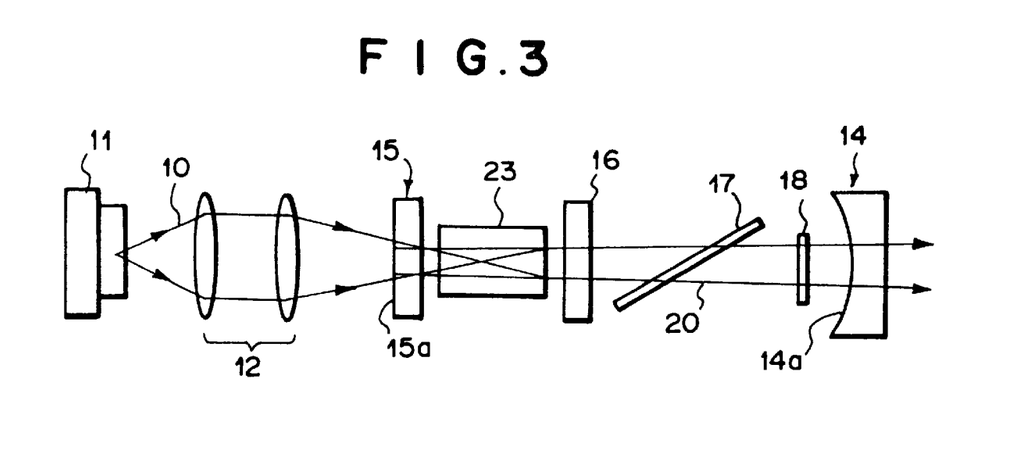
FIG. 3 is a schematic side view of a solid state laser in accordance with a second embodiment of the present invention.
Figure 4:
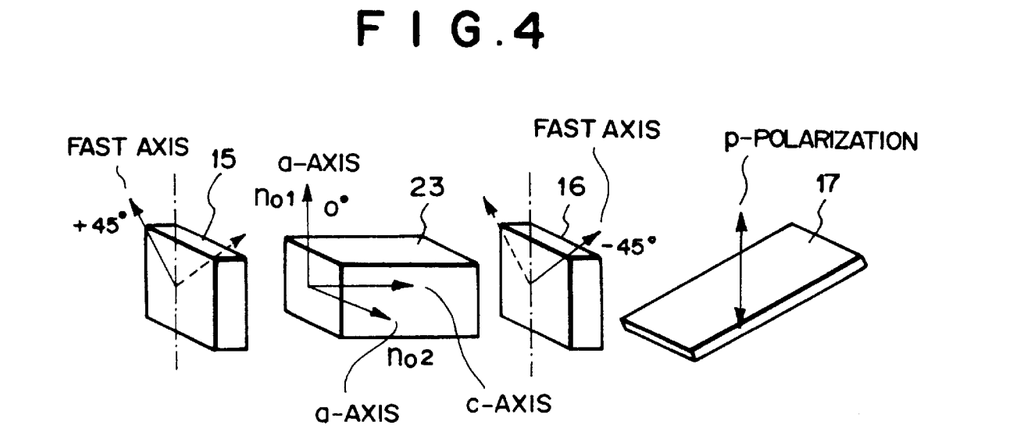
FIG. 4 is a schematic fragmentary perspective view showing an important part of the solid state laser of the second embodiment.

A second embodiment of the present invention will be described with reference to FIGS. 3 and 4, hereinbelow. In FIGS. 3 and 4, the elements analogous to those shown in FIGS. 1 and 2 are given the same reference numerals and will not described here.

The laser diode-pumped solid state laser of this embodiment differs from that of the first embodiment in that a c-cut Nd:YLF crystal 23 is employed in place of an a-cut Nd:YLF crystal 13 employed in the first embodiment.

The semiconductor laser 11 emits a laser beam 10 having a wavelength of 797 nm at an output power of 2 W. The Nd:YLF crystal 23 is doped with 2 at % of Nd and is 3 mm in crystal length. Neodymium ions in the Nd:YLF crystal 23 are pumped by the laser beam 10 and the Nd:YLF crystal 23 thereby produces a laser beam having a wavelength of 1314 nm.

The end face 15a of the λ/4 plate 15 facing the semiconductor laser 11 is provided with a coating which is highly reflective to light at 1314 nm and the mirror surface 14a of the resonator mirror 14 is provided with a coating which transmits only a part of light at 1314 nm. Thus light at 1314 nm oscillates between the surfaces 15a and 14a and a laser beam 20 at 1314 nm is generated. The laser beam 20 is emitted through the resonator mirror 14.

Also in this embodiment, the oscillation mode is made of a single longitudinal mode by the twisted mode forming effect of the λ/4 plates 15 and 16 and the wavelength selection effect of the etalon 18. Further the direction of linear polarization of the laser beam 20 is set to the vertical direction as seen in FIGS. 3 and 4 by the Brewster plate 17.

The c-cut Nd:YLF crystal 23 is positioned so that the c-axis extends in parallel to the optical axis of the resonator as shown in FIG. 4. In this case, the laser beam 20 basically does not experience birefringence, that is, the Nd:YLF crystal 23 basically functions as an isotropic crystal.

However when the pumping laser beam 10 keeps impinging upon the Nd:YLF crystal 23, birefringence is thermally induced in the Nd:YLF crystal 23 and the Nd:YLF crystal 23 comes to inhibit anisotropy. This anisotropy has an optical axis directed in a particular direction which direction is substantially aligned with the direction of the a-axis in the case of the Nd:YLF crystal 23.

Figure 10:
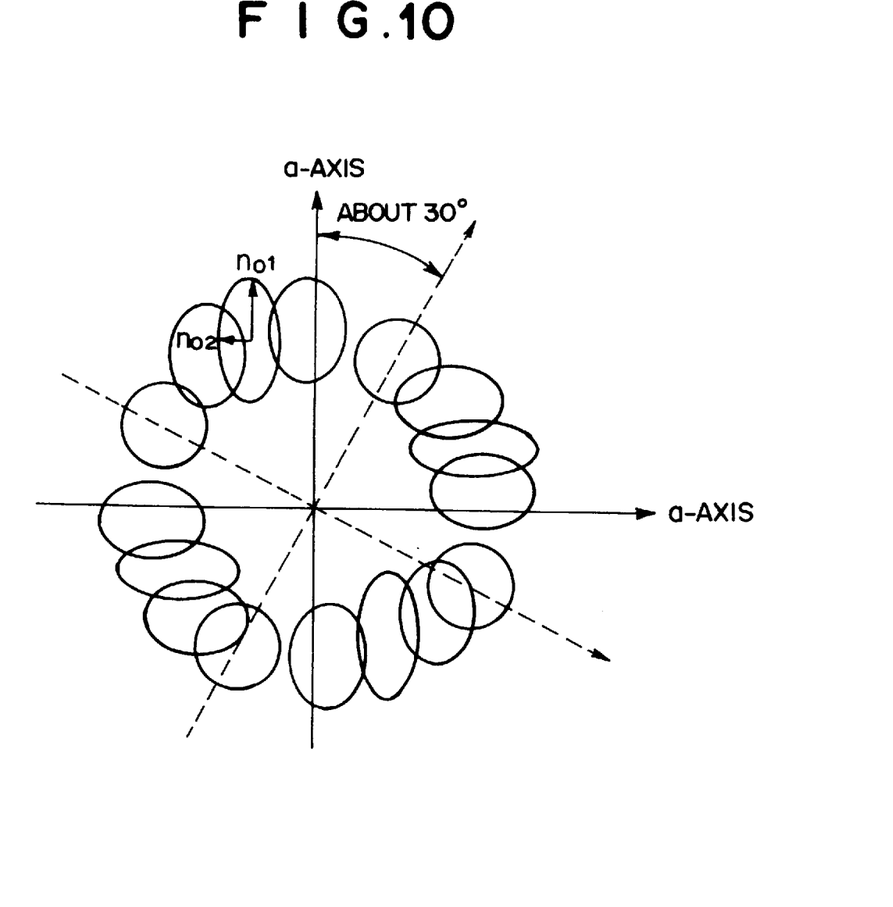
FIG. 10 is a schematic view showing a pattern in which heat-induced birefringence is generated in a Nd:YLF crystal.

In FIG. 10, the refractive index distribution of the heat-induced birefringence of the Nd:YLF crystal 23 at the laser beam input/output interface is shown by index ellipsoids. The vertical diameter of each ellipsoid shows refractive index no1 and the horizontal diameter shows refractive index no2.

The Nd:YLF crystal 23 is positioned so that an optical axis of the heat-induced birefringence (the direction in which the laser beam 20 experiences refractive index no1) is oriented in the direction of the linear polarization of the solid state laser beam set by the Brewster plate 17. With this arrangement, the influence of heat-induced birefringence is cancelled and the resonator loss can be suppressed, whereby the solid state laser can operate at a high output power as described above.

In this embodiment, the output power of the laser beam was 600 mW. In a conventional solid state laser which is substantially the same in the structure as that shown in FIG. 3 except that neither of the optical axes of heat-induced birefringence is oriented in the direction of the linear polarization of the solid state laser beam 20 set by the Brewster plate 17, the output power of the laser beam is generally not higher than 300 mW. This fact proves the effect of the present invention.

As the solid laser crystal exhibiting heat-induced birefringence, various crystals other than a Nd:YLF crystal 23 may also be employed. For example, a crystal of Nd:YAG, Nd:YVO$_4$, Nd:GdVO$_4$, Yb:YAG, Yb:YLF, Cr:LiSAF, Cr:LiCAF, LNA(La$_{1-x}$Nd$_x$MgA$_{11}$O$_{19}$ or the like may be employed.

Figure 5:
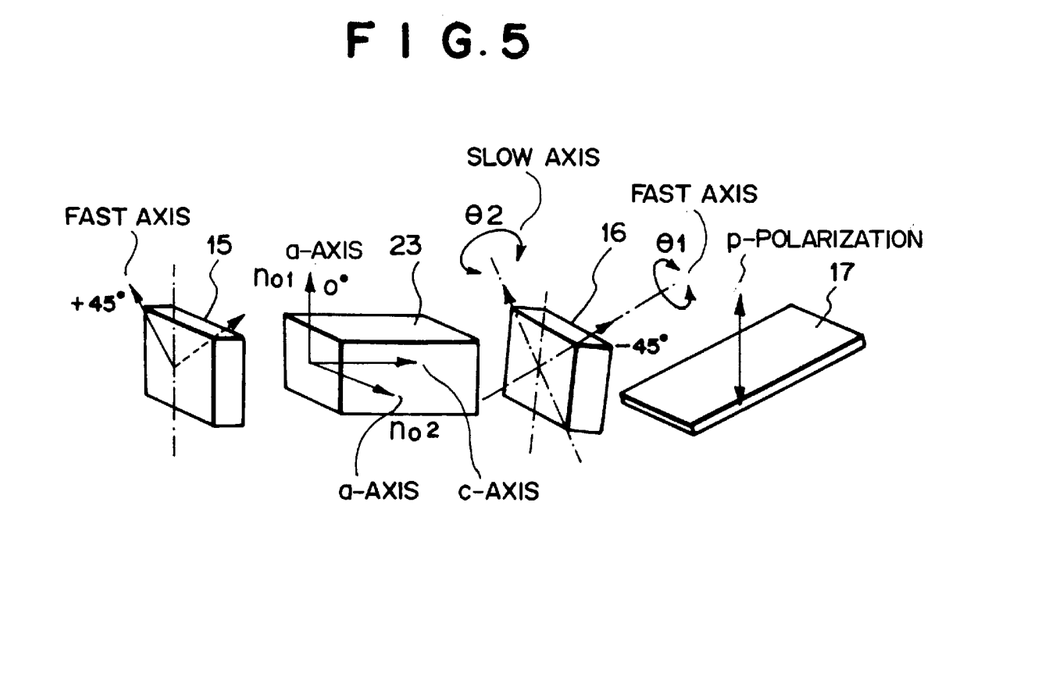
FIG. 5 is a schematic fragmentary perspective view showing an important part of the solid state laser of a third embodiment of the present invention.

A third embodiment of the present invention will be described with reference to FIG. 5, hereinbelow. The laser diode-pumped solid state laser of this embodiment differs from that shown in FIGS. 3 and 4 in that one $\lambda/4$ plate 16 is held so that angle θ1 about the fast axis and angle θ2 about slow axis are adjustable.

Also in this embodiment, the oscillation mode is made of a single longitudinal mode by the twisted mode forming effect of the $\lambda/4$ plates 15 and 16 and the wavelength selection effect of the etalon 18. Further the direction of linear polarization of the laser beam 20 is set to the vertical direction as seen in FIG. 5 by the Brewster plate 17.

The quantum of the phase of the $\lambda/4$ plate 15 and 16 is often shifted from 90°, a designed value, by ±5% due manufacturing error, which increases the resonator loss and lowers the output power of the laser beam.

We have found that even if the quantum of phase of each $\lambda/4$ plate is shifted from 90°, the resonator loss can be suppressed and the solid state laser can operate at a high power so long as the difference in the quantum of the phase between the two $\lambda/4$ plates 15 and 16 is not larger than 3° (preferably not larger than 1°).

In this embodiment, since the $\lambda/4$ plate 16 is held so that angle θ1 about the fast axis and angle θ2 about slow axis are adjustable, inclination of the $\lambda/4$ plate 16 relative to the optical axis of the laser oscillation can be controlled so that the difference in the quantum of the phase between the two $\lambda/4$ plates 15 and 16 is not larger than 3° (preferably not larger than 1°).

In this embodiment, the output power of the laser beam 20 was 600 mW for an output of 2 w of the semiconductor laser 11. In a conventional solid state laser which is substantially the same in the structure as that shown in FIG. 5 except that the difference in the quantum of the phase between the two $\lambda/4$ plates 15 and 16 is larger than 3°, the output power of the laser beam is generally 100 mW to 300 mW. This fact proves the effect of the present invention.

Though, in this embodiment, the $\lambda/4$ plate 16 is held so that angle θ1 about the fast axis and angle θ2 about slow axis are both adjustable, the $\lambda/4$ plate 16 may be held so that only one of the angles θ1 and θ2 is adjustable.

Figure 11:
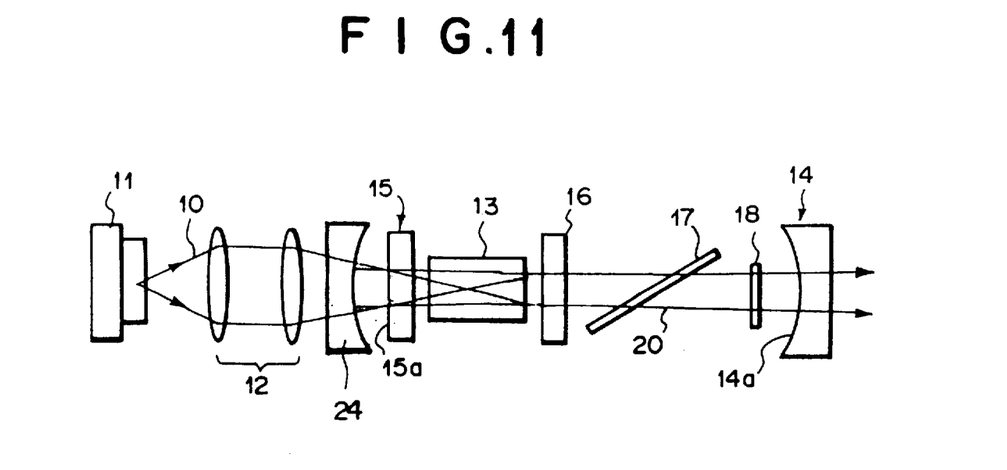
FIG. 11 is a schematic side view of a solid state laser in accordance with a seventh embodiment of the present invention.

Further the angle(s) of the other $\lambda/4$ plate 15 may be adjusted in addition to the angle(s) of the $\lambda/4$ plate 16. In this case, the $\lambda/4$ plate 15 should be provided with a coating which is untireflective to the laser beam 20 and a rear resonator mirror 24 should be disposed between the $\lambda/4$ plate 15 and the condenser lens 12 as in a seventh embodiment shown in FIG. 11.

Figure 6:
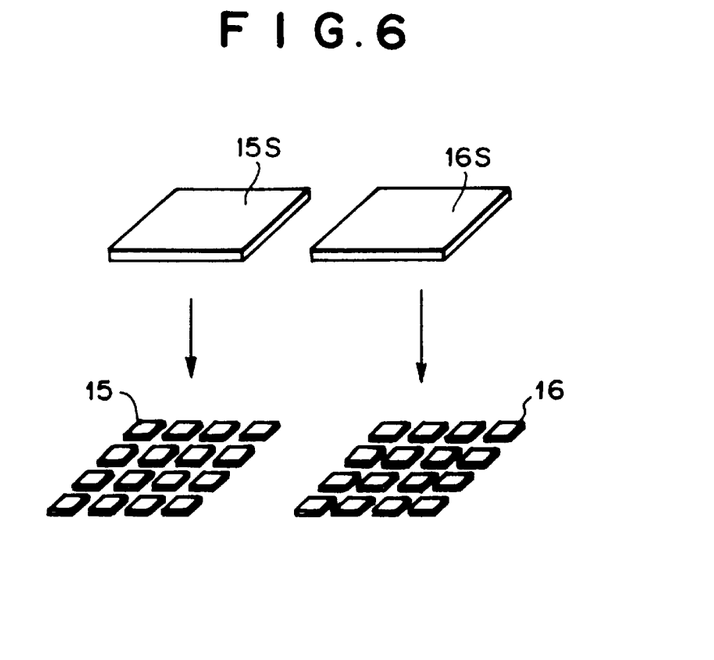
FIG. 6 is a schematic view for illustrating the manner of producing a pair of λ/4 plates in accordance with a fourth embodiment of the present invention.

A method of making the $\lambda/4$ plates 15 and 16 in accordance with a fourth embodiment of the present invention will be described with reference to FIG. 6, hereinbelow.

In this method, a pair of $\lambda/4$ plate substrates 15S and 16S cut in the same orientation are prepared and are simultaneously ground by one grinder. Then the $\lambda/4$ plate substrates 15S and 16S are provided with predetermined coatings. Then the $\lambda/4$ plate substrate 15S is cut into a plurality of $\lambda/4$ plates of a predetermined size, thereby forming a $\lambda/4$ plate 15, and the $\lambda/4$ plate substrate 16S is cut into a plurality of $\lambda/4$ plates of a predetermined size, thereby forming a $\lambda/4$ plate 16.

When the $\lambda/4$ plates 15 and 16 are thus made, the $\lambda/4$ plates can be accurately equal to each other in thickness and the difference in the quantum of the phase between the two $\lambda/4$ plates 15 and 16 can be not larger than 3° or not larger than 1°.

Three or more $\lambda/4$ plate substrates may be ground at one time, or a single $\lambda/4$ plate substrate may be cut into $\lambda/4$ plates 15 and 16 after grinding.

The $\lambda/4$ plates 15 and 16 may be formed of any birefringent material including, for instance, rock crystal, sapphire, MgF$_2$, TeO$_2$, calcite, mica, YVO$_4$ and the like.

Figure 7:
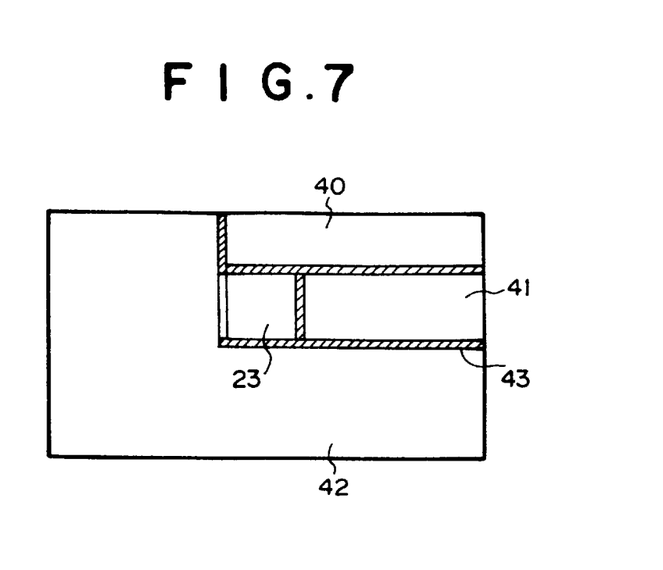
FIG. 7 is a schematic fragmentary perspective view showing an important part of the solid state laser of a fifth embodiment of the present invention.

A fifth embodiment of the present invention will be described with reference to FIG. 7, hereinbelow. FIG. 7 shows a structure for fixing a Nd:YLF crystal 23 employed in a laser diode-pumped solid state laser in accordance with the fifth embodiment of the present invention, as seen from a light passing end face of the Nd:YLF crystal 23. The solid state laser of this embodiment is substantially 25 the same in structure as that shown in FIGS. 3 and 4 except the structure for fixing the Nd:YLF crystal 23.

The Nd:YLF crystal 23 exhibits heat-induced birefringence and is rectangular ion shape. Out of the four side faces, except the two light passing end faces, three side faces are bonded to three heat radiator blocks 40, 41 and 42 by adhesive layer 42. The heat radiator blocks 40, 41 and 42 are of metal such as CuTe. Further the heat radiator blocks 40, 41 and 42 are bonded together by an adhesive layer 43.

As in the embodiment shown In FIGS. 3 and 4, the Nd:YLF crystal 23 is positioned so that an optical axis of the heat-induced birefringence is oriented in the direction of the linear polarization set by the Brewster plate 17.

In this embodiment, the output power of the laser beam 20 was 700 mW for an output of 2 w of the semiconductor laser 11. In the solid state laser shown in FIGS. 3 and 4 which is substantially the same in the structure as that of this embodiment except that the Nd:YLF crystal 23 is bonded to the radiator blocks 40, 41 and 42, the output power of the laser beam is generally 600 mW. This fact proves that the output power is increased by fixing the Nd:YLF crystal 23 to the radiator blocks 40, 41 and 42.

Figure 8:
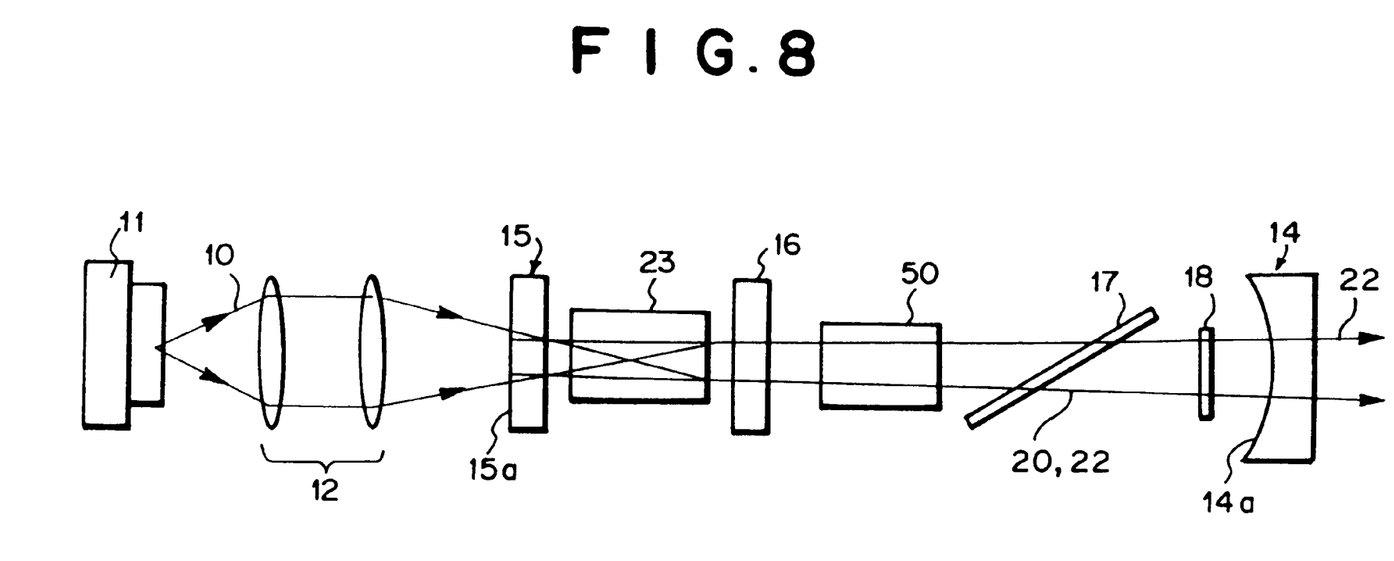
FIG. 8 is a schematic side view of a solid state laser in accordance with a sixth embodiment of the present invention.
Figure 9:
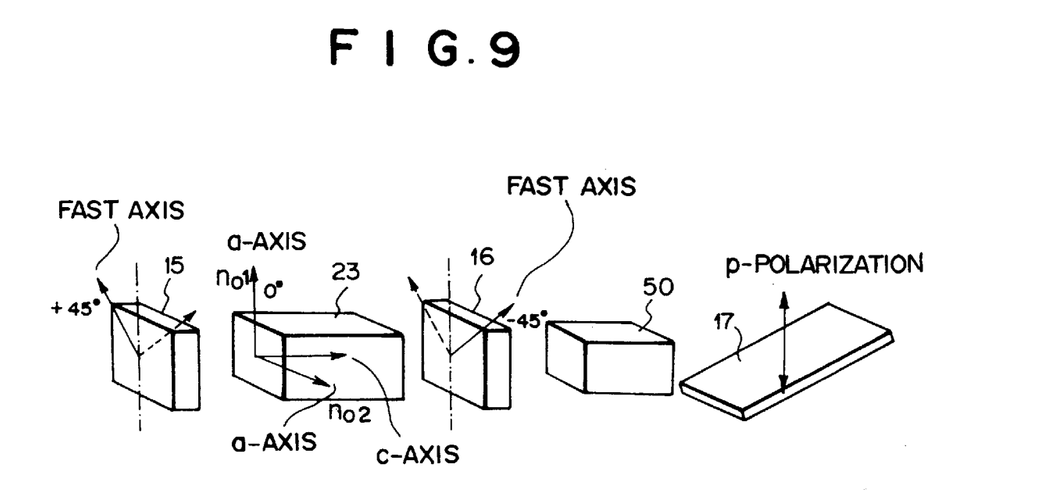
FIG. 9 is a schematic fragmentary perspective view showing an important part of the solid state laser of the sixth embodiment.

A sixth embodiment of the present invention will be described with reference to FIGS. 8 and 9, hereinbelow. The laser diode-pumped solid state laser of this embodiment differs from that shown in FIGS. 3 and 4 in that an optical wavelength conversion element 50 is disposed between the $\lambda/4$ plate 16 and the Brewster plate 17.

The optical wavelength conversion element 50 may be, for instance, a MgO:LN (LiNbO$_3$ doped with MgO) crystal having periodic domain reversals. The solid laser beam at 1314 nm impinges upon the optical wavelength conversion element 50 is converted its second harmonic 22 at 657 nm.

The end face 15a of the $\lambda/4$ plate 15 facing the semiconductor laser 11 is provided with a coating which is highly reflective to light at 1314 nm and 657 nm and the mirror surface 14a of the resonator mirror 14 is provided with a coating which transmits only a part of light at 657 nm. Accordingly only the second harmonic 22 is emitted through the resonator mirror 14.

In this embodiment, the λ/4 plates 15 and 16 are made of a pair of λ/4 plate substrates which are simultaneously ground as in the fourth embodiment.

In the laser diode-pumped solid state laser of this embodiment, the output of the second harmonic 22 was very high and 500 mW for the output of 2 W of the semiconductor laser 11.

What is claimed is:

1. A solid state laser comprising:

a resonator, a solid laser crystal disposed in the resonator, a pumping source for pumping the laser crystal, a pair of λ/4 plates which are disposed in the resonator with the laser crystal intervening therebetween, and a polarization control element which is disposed in the resonator and sets the linear polarization of the solid state laser beam in a predetermined direction, wherein the solid laser crystal is a birefringent crystal and wherein an optical axis of the birefringence of the solid laser crystal is oriented in the direction of the linear polarization of the solid state laser beam set by the polarization control clement.

2. A solid state laser comprising:

a resonator, a solid laser crystal disposed in the resonator, a pumping source for pumping the laser crystal, a pair of λ/4 plates which are disposed in the resonator with the laser crystal intervening therebetween, and a polarization control element which is disposed in the resonator and sets the linear polarization of the solid state laser beam in a predetermined direction, wherein the solid laser crystal is an isotropic crystal exhibiting heat-induced birefringence, and wherein an optical axis of the heat-induced birefringence of the solid laser crystal is oriented in the direction of the linear polarization of the solid state laser beam set by the polarization control element.

3. A solid state laser comprising:

a resonator, a solid laser crystal disposed in the resonator, a pumping source for pumping the laser crystal, a pair of λ/4 plates which are disposed in the resonator with the laser crystal intervening therebetween, a polarization control element which is disposed in the resonator and sets the linear polarization of the solid state laser beam in a predetermined direction, and a heat radiator block of metal fixed to the solid laser crystal, wherein the solid laser crystal is an isotropic crystal exhibiting heat-induced birefringence.

4. A solid state laser comprising;

a resonator, a solid laser crystal disposed in the resonator, a pumping source for pumping the laser crystal, a pair of λ/4 plates which are disposed in the resonator with the laser crystal intervening therebetween, and a polarization control element which is disposed in the resonator and sets the linear polarization of the solid state laser beam in a predetermined direction, wherein the differences in quantum of the phase between the two λ/4 plates is not larger than 3°.

5. A solid state laser as defined in claim 4, wherein the difference in quantum of the phase between the two λ/4 plates is not larger than 1°.

6. A solid state laser as define in claim 4 or 5 wherein the difference in quantum of the phase between the two λ/4 plates is controlled by inclining at least one of the λ/4 plates relative to the optical axis of the laser oscillation.

7. A solid state laser as defined in claim 4 or 5 wherein the pair of λ/4 plates are cut in the same orientation and ground under the same condition.

8. A solid state laser as defined in claim 7 wherein the λ/4 plates cut in the same orientation and ground under the same condition are made by grinding a single λ/4 plate material and dividing it into a pair of λ/4 plates.

9. A method as defined in claim 7 in which the λ/4 plates cut in the same orientation and ground under the same condition are made by simultaneously grinding a pair of λ/4 plate materials cut in the same orientation and cutting the materials into the respective λ/4 plates.

10. A method of manufacturing a solid state laser, comprising the following steps:

providing a resonator;

positioning a solid laser crystal in the resonator;

providing a pumping source for pumping the laser crystal;

providing a pair of λ/4 plates in the resonator with the laser crystal disposed therebetween so as produce an oscillation beam of a twisted mode;

locating a polarization control element in the resonator to set the linear polarization of the solid state laser beam in a predetermined direction; and maintaining the difference in quantum of the phase between the two λ/4 plates so as to be not larger than 3° by inclining at least one of the λ/4 plates relative to the optical axis of the laser oscillator.

11. The method of claim 10 further comprising the steps of forming the pair of λ/4 plates by cutting the plates in the same orientation and grinding them under the same condition.

12. The method of claim 11 wherein the forming step includes grinding a single λ/4 plates material and dividing said plate material to said pair of λ/4 plates.

13. A method of defining claim 11, wherein the forming step includes simultaneously grinding said pair of λ/4 plates type materials cut in the same orientation of cutting the materials to respective λ/4 plates.

* * * * *